R. DAUGHERTY.
DRILL GAGE.
APPLICATION FILED SEPT. 26, 1910.
1,002,502.
Patented Sept. 5, 1911.
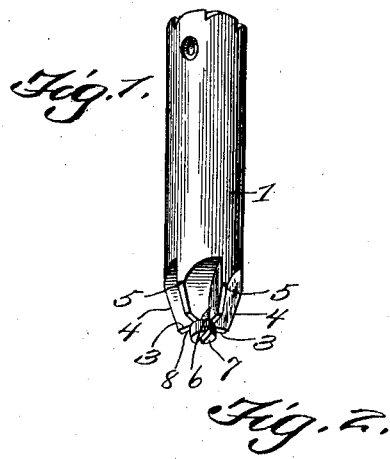
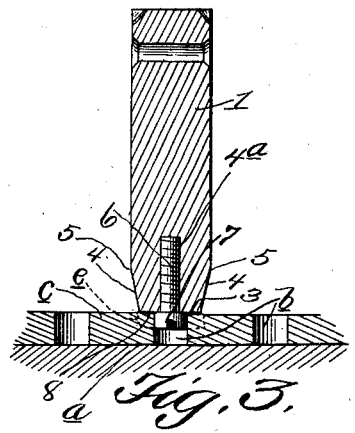
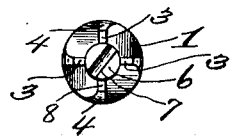
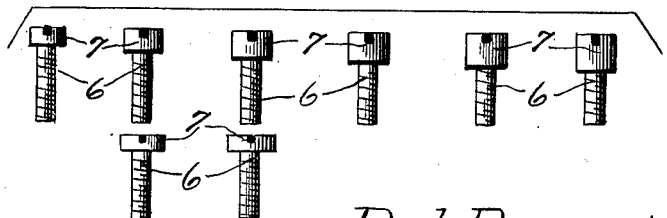
Witnesses
Reil Daugherty Inventor
by C. A. Snow & Co.
Attorneys

UNITED STATES PATENT OFFICE.

REIL DAUGHERTY, OF HARRISBURG, PENNSYLVANIA.

DRILL-GAGE.

1,002,502. Specification of Letters Patent. Patented Sept. 5, 1911.

Application filed September 26, 1910. Serial No. 583,902.

*To all whom it may concern:*

Be it known that I, REIL DAUGHERTY, a citizen of the United States, residing at Harrisburg, in the county of Dauphin and State of Pennsylvania, have invented a new and useful Drill-Gage, of which the following is a specification.

This invention belongs to the art of drills, and it more especially relates to new and useful means applicable to counter-bores, in order to permit mechanics to retain the depths of counter-bores at a uniformity.

The primary object of the invention is to provide a device of this design, in which there is involved various novel features of construction.

It will be remembered, however, that all counter-bores are formed with small lugs or teats (which are integral with the tool), in order to retain the counter-bore centered with regard to the drilled hole; but when the drilled hole varies slightly in diameter and depth, a different counter-bore has to be utilized to fit the same. This inconvenience utilizes considerable time, and one of the objects of the invention is to obviate this difficulty. Moreover, prior to this invention, there was no way in retaining to a certainty, the predetermined depth of counter-bores, and where there were a number of counter-bores to be bored, there was no way of holding them at a uniform depth.

The invention in its broadest aspect aims as these primary objects, to provide means to overcome the above enumerated difficulties, and to hold the counter-bores at a uniformity. There is provided a plurality of screw members, such as shown in Fig. 4, having heads of different depths and diameters, any one of which may be used in a manner as shown in Fig. 2.

In using a device of this character, the material to be worked upon is placed upon a base or bench as shown at $a$ in Fig. 2, after which a screw having a head, the diameter of which corresponds to the diameter of the hole —$b$— in the material —$c$— is threaded into the boring end of the tool, so that the head of the screw is brought in close contact with the lower extremity of the counter-bore 1. The depth of the head of the screw corresponds in depth to the counter-bore which is desired in the material, as shown in dotted lines at —$e$— in Fig. 2. After motion is imparted to the tool, the same will cut into the material until the head 7 of the screw contacts with the upper surface of the bench or base, on which the material is arranged. When the head 7 contacts with the bench or base, the cutting action of the tool ceases. It will be observed that in this manner a number of counter-bores may be cut or bored, all of which may have a uniform depth. By turning the screw in close contact with the lower extremity of the counter-bore the same is held securely in place, as shown in the sectional view of the drawings. When disposing the screw in the manner shown in Fig. 2, the same should be arranged exactly concentric with the center of the counter-bore or tool, so that the tool will assume a position exactly concentric with the hole $b$ in the material $c$, as shown in Fig. 2.

The invention aims as a further object to provide one or more screws, the heads of which vary in depth and in diameters, so that counter-bores of various depths may be bored. When it is desired to drill a counter-bore of a certain depth, a screw including a head of the desired depth and diameter is inserted in the extreme portion of the counter-bore, then the tool is disposed until the end arranges solid adjacent a plate or base, as shown in Fig. 2, in which the work is being accomplished, after which one proceeds in the usual manner. In the drawings, however, there is only disclosed one form of the invention, but in practical fields this form may necessitate slight alterations, to which the applicant is entitled, provided the alterations are comprehended by the appended claim.

Other features and combination of parts will be hereinafter more fully set forth, shown in the drawings and claim.

In the drawings: Figure 1 is a perspective view, showing the application of the invention. Fig. 2 is a sectional view through the counter-bore. Fig. 3 is an end view of the counter-bore showing the application of the invention. Fig. 4 is a view showing a plurality of screws, each having a head of a different size.

In regard to the drawings, 1 designates the usual form of counter-bore, having the usual form of cutting edges and angles, 3, 4 and 5, as shown in Fig. 1.

Referring to the sectional view of the drawing, it will be observed that the counter-bore is provided with a threaded bore $4^a$, the depth of which may be varied, in accordance with the practical demands in the trade. Furthermore, as shown in the sectional view, there will be seen a screw 6, having the usual form of threads to engage the threads of the bore of the counter-bore. It will be further observed that the head 7 of the screw is of a diameter less than the diameter of the smaller portion of the counter-bore, in order to provide a shoulder 8, whereby a mechanic will be permitted to obtain an effective cutting edge, by placing the shoulder adjacent the material, in which the counter-bore is desired.

It will be manifest that anyone of the screws shown in the drawings may be utilized, there being no restriction as to the diameters and depths of screw heads in so far as the present invention is concerned. It will be observed from the foregoing, in connection with the annexed drawings, that novel means have been devised whereby the depth of a counter-bore can be regulated.

Noting Fig. 3, it will be seen that when the screw 6 is rotated to a firm seat, the head 7 of the screw will abut against the ends of the cutting ribs 3, at the same time that the opposite end of the screw abuts against the tool at the base of the bore 4ª. By reason of this construction, the head 7 of the screw will be prevented from coming too closely into contact with the ends of the cutting ribs 3, a contingency likely to dull the end edges of the cutting ribs, and to render the screw 6 difficult to remove, owing to the fact that the ribs 3 tend to bite into the head 7 of the screw. Moreover, referring to Fig. 3, it will be seen that when the screw 6 is rotated to a firm seat, the kerf in the screw will be so positioned that its ends will be located between the ribs, whereby a screw-driver may be reciprocated in the kerf, longitudinally of the kerf, to clear the same of accumulated material, without striking the cutting ribs 3.

The invention having been set forth, what is claimed as new and useful is:

A boring tool having a central, threaded opening and radial cutting ribs about the opening; and a headed screw having a kerf, and adapted to be threaded into the opening, the screw abutting against the tool at both the headed end and the opposite end of the screw, whereby to prevent an undue compression of the head of the screw against the ends of the ribs; the engagement between the screw and the tool, when the screw is firmly seated, serving to position the kerf with its ends between the ribs, whereby a screw driver may be reciprocated in the kerf, longitudinally of the kerf, to clean the same of accumulated material, without striking the ribs.

In testimony that I claim the foregoing as my own, I have hereto affixed my signature in the presence of two witnesses.

REIL DAUGHERTY.

Witnesses:
E. W. MILLER,
A. F. OHENM.

Copies of this patent may be obtained for five cents each, by addressing the "Commissioner of Patents. Washington, D. C."